United States Patent
Chandler et al.

(10) Patent No.: US 7,822,728 B1
(45) Date of Patent: Oct. 26, 2010

(54) METADATA PIPELINING AND OPTIMIZATION IN A FILE SERVER

(75) Inventors: Richard G. Chandler, West Hartford, CT (US); Stephen A. Fridella, Newton, MA (US); Sorin Faibish, Newton, MA (US); Uday K. Gupta, Westford, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 639 days.

(21) Appl. No.: 11/557,941

(22) Filed: Nov. 8, 2006

(51) Int. Cl.
*G06F 7/00* (2006.01)
*G06F 17/00* (2006.01)

(52) U.S. Cl. .................. 707/704; 707/700; 707/999.008

(58) Field of Classification Search .................. 707/204, 707/205, 700, 704, 999.008
See application file for complete search history.

(56) References Cited

U.S. PATENT DOCUMENTS

| | | | |
|---|---|---|---|
| 5,642,501 A * | 6/1997 | Doshi et al. ..................... | 707/8 |
| 5,734,898 A | 3/1998 | He | |
| 5,819,292 A * | 10/1998 | Hitz et al. .................... | 707/203 |
| 5,852,747 A | 12/1998 | Bennett et al. | |
| 5,893,140 A * | 4/1999 | Vahalia et al. .............. | 711/118 |
| 6,032,216 A | 2/2000 | Schmuck et al. | |
| 6,122,630 A * | 9/2000 | Strickler et al. ................ | 707/8 |
| 6,157,991 A * | 12/2000 | Arnon ......................... | 711/161 |
| 6,192,408 B1 | 2/2001 | Vahalia et al. | |
| 6,324,581 B1 * | 11/2001 | Xu et al. ..................... | 709/229 |
| 6,389,420 B1 | 5/2002 | Vahalia et al. | |
| 6,434,681 B1 * | 8/2002 | Armangau ................... | 711/162 |
| 6,449,614 B1 * | 9/2002 | Marcotte ....................... | 707/8 |
| 6,453,354 B1 | 9/2002 | Jiang et al. | |
| 6,973,455 B1 | 12/2005 | Vahalia et al. | |
| 7,010,554 B2 | 3/2006 | Jiang et al. | |
| 7,039,663 B1 * | 5/2006 | Federwisch et al. ......... | 707/205 |
| 7,085,815 B2 | 8/2006 | Dixon et al. | |
| 7,085,909 B2 | 8/2006 | Ananthanarayanan et al. | |
| 7,103,586 B2 * | 9/2006 | Holenstein et al. ............. | 707/1 |

(Continued)

OTHER PUBLICATIONS

Uresh Vahalia, Unix Internals: The New Frontiers, Chapter 9, "File System Implementations," 1996, p. 261-289, Prentice-Hall, Inc., Upper Saddle River, NJ.

(Continued)

*Primary Examiner*—Apu M Mofiz
*Assistant Examiner*—Jared M Bibbee
(74) *Attorney, Agent, or Firm*—Richard Auchterlonie; Novak Druce & Quigg, LLP

(57) ABSTRACT

A read-write access to a file in a file server includes an initial metadata access step, an asynchronous read or write of file data, and a metadata commit step. In order to parallelize access to a range locking database, an inode and indirect file block mapping database, and a pre-allocation data base, operations are pipelined within the metadata access step and also within the metadata commit step. The pipelined operations within the metadata access step include a first stage of range locking, a second stage of reading block mapping metadata, and a third stage of reading and updating a pre-allocation map for write access. The pipelined operations within the metadata commit step include a first stage of releasing range locks, a second stage of accessing old block metadata for write access, and a third stage of updating metadata and flushing the pre-allocation map for write access.

26 Claims, 9 Drawing Sheets

U.S. PATENT DOCUMENTS

| | | | |
|---|---|---|---|
| 7,124,266 B1 * | 10/2006 | Harmer et al. | 711/163 |
| 7,225,317 B1 | 5/2007 | Glade et al. | |
| 2002/0133507 A1 * | 9/2002 | Holenstein et al. | 707/200 |
| 2005/0039049 A1 * | 2/2005 | Chang et al. | 713/201 |
| 2005/0066095 A1 | 3/2005 | Mullick et al. | |
| 2005/0108186 A1 * | 5/2005 | Anderson | 707/1 |
| 2006/0064554 A1 | 3/2006 | Fridella et al. | |
| 2007/0055702 A1 | 3/2007 | Fridella et al. | |
| 2007/0088702 A1 | 4/2007 | Fridella et al. | |
| 2008/0005468 A1 | 1/2008 | Faibish et al. | |

OTHER PUBLICATIONS

Steve Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

EMC Celerra HighRoad, EMC White Paper, Jan. 2002, 13 pages, EMC Corporation, Hopkinton, MA.

Enginuity: The Symmetrix Storage Operating Environment, EMC White Paper, Jul. 2005, 21 pages, EMC Corporation, Hopkinton, MA.

S. Shepler et al., "Network File System (NFS) version 4 Protocol," RFC 3530, Network Working Group, Sun Microsystems, Inc., Mountain View, CA, Apr. 2003, 275 pages.

Sukwoo Kang and A. L. Narasimha Reddy, "Virtual Allocation: A scheme for flexible storage allocation," Proc. of OASIS workshop in conjunction with ASPLOS, Oct. 9-13, 2004, Boston, MA, 6 pages, Association for Computing Machinery, Washington, DC.

Shiv Sikand and Roger March, "Highly Scalable, High Performance Perforce Server Environments," Perforce User Conference, May 8-9, 2003, Las Vegas, NV, 12 pages, Perforce Software Inc., Alameda, CA.

Philip Trautman and Jim Mostek, "Scalability and Performance in Modern File Systems," printed May 6, 2005, 18 pages, Silicon Graphics, Mountain View, CA.

Menon et al., "IBM Storage Tank—a heterogeneous scalable SAN file system," IBM Systems Journal, vol. 42, No. 2, 2003, pp. 250-267, IBM Corp., Armonk, NY.

* cited by examiner

METADATA PIPELINING AND OPTIMIZATION IN A FILE SERVER

FIELD OF THE INVENTION

The present invention relates generally to a file server providing concurrent read-write access of multiple clients to the same file.

BACKGROUND OF THE INVENTION

Network data storage is most economically provided by an array of low-cost disk drives integrated with a large semiconductor cache memory. A number of data mover computers are used to interface the cached disk array to the network. The data mover computers perform file locking management and mapping of the network files to logical block addresses of storage in the cached disk array, and move data between network clients and the storage in the cached disk array.

Data consistency problems may arise if multiple clients or processes have concurrent access to read-write files. Typically write synchronization and file locking have been used to ensure data consistency. For example, the data write path for a file has been serialized by holding an exclusive lock on the file for the entire duration of creating a list of data buffers to be written to disk, allocating the actual on-disk storage, and writing to storage synchronously. Unfortunately, these methods involve considerable access delays due to contention for locks not only on the files but also on the file directories and a log used when committing data to storage. In order to reduce these delays, a file server may permit asynchronous writes in accordance with version 3 of the Network File System (NFS) protocol. Also, in a multi-processor server, a respective one of the processors is pre-assigned to service requests for metadata of each file or file system. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference, and Xu et al., U.S. Pat. No. 6,324,581 issued Nov. 27, 2001, incorporated herein by reference.

More recently, byte range locking to a file has been proposed in version 4 of the NFS protocol. (See NFS Version 3 Protocol Specification, RFC 1813, Sun Microsystems, Inc., June 1995, and NFS Version 4 Protocol Specification, RFC 3530, Sun Microsystems, Inc., April 2003.) Asynchronous writes and range locking alone will not eliminate access delays due to contention during allocation and commitment of file metadata. A Unix-based file in particular contains considerable metadata in the inode for the file and in indirect blocks of the file. The inode, for example, contains the date of creation, date of access, file name, and location of the data blocks used by the file in bitmap format. The NFS protocol specifies how this metadata must be managed. In order to comply with the NFS protocol, each time a write operation occurs, access to the file is not allowed until the metadata is updated on disk, both for read and write operations. In a network environment, multiple clients may issue simultaneous writes to the same large file such as a database, resulting in considerable access delay during allocation and commitment of file metadata.

A method of permitting concurrent writes from multiple clients to the same file is disclosed in Mullick et al., published patent application No. US 2005/0066095 A1, published Mar. 24, 2005, entitled "Multi-threaded Write Interface and Methods for Increasing the Single File Read and Write Throughput of a File Server," incorporated herein by reference. Each read-write operation includes three successive steps. The first step includes inode access for reads and writes, and also pre-allocation for writes. The second step includes an asynchronous read or write. The third step includes inode access for a metadata commit. Since the asynchronous write does not involve any metadata interaction, these three steps can be pipelined. The pre-allocation in the first step is achieved asynchronously, and an allocation mutex prevents multiple pre-allocations from occurring simultaneously for the same file. Once the metadata pre-allocation step is complete, the asynchronous write of the data to disk in the second step can be handled independently of the metadata pre-allocation. With pipelining, multiple asynchronous writes can be performed concurrently. In the third step, the final commit of the allocations is also achieved synchronously. The allocation mutex prevents pre-allocation for the same file from occurring at the same time as a commit for the same file. However, multiple commits for the same file may occur simultaneously by gathering the commit requests together and committing them under the same allocation mutex. Thus, execution of a write thread for writing to a file includes obtaining an allocation mutex for the file, and then preallocating new metadata blocks that need to be allocated for writing to the file, and then releasing the allocation mutex for the file, and then issuing asynchronous write requests for writing to the file, waiting for callbacks indicating completion of the asynchronous write requests, obtaining the allocation mutex for the file, and then committing the preallocated metadata blocks, and then releasing the allocation mutex for the file.

SUMMARY OF THE INVENTION

It has been discovered that it is possible to enhance the execution of concurrent read-write operations to non-overlapping byte ranges within the same file by pipelining operations within the initial metadata access step and also by pipelining operations within the metadata commit step. The pipelined operations parallelize access to a range locking database, an inode and indirect file block mapping database, and a pre-allocation database. The pipelined operations within the metadata access step include a first stage of range locking, a second stage of reading block mapping metadata, and a third stage of reading and updating a pre-allocation map for write access. The pipelined operations within the metadata commit step include a first stage of releasing range locks, a second stage of accessing old block metadata for write access, and a third stage of updating metadata and flushing the pre-allocation map for write access.

In accordance with one aspect, the invention provides a method of operating a file server for providing clients with concurrent write access to respective byte ranges of a file in storage of the file server. The method includes the file server responding to a concurrent write request from a client by accessing metadata of the file to obtain a block mapping for the concurrent write request, and then writing data from the client to the file using the block mapping for the concurrent write request, and then committing metadata changes to the file. The file server accesses the metadata of the file to obtain the block mapping for the concurrent write request by accessing a range locking database in the file server to set a respective exclusive byte range lock, accessing a file block mapping database in the file server, and accessing a pre-allocation database in the file server. The file server commits the metadata changes to the file by accessing the range locking database to release the respective exclusive byte range lock, accessing the file block mapping database, accessing the pre-allocation database, and writing the metadata changes to the storage of the file server.

In accordance with another aspect, the invention provides a method of operating a file server for providing clients with concurrent write access to respective byte ranges of a file in storage of the file server. The method includes the file server responding to a concurrent write request from a client by accessing metadata of the file to obtain a block mapping for the file, and then asynchronously writing data from the client to the file using the block mapping for the file, and then committing metadata changes to the file. The file server accesses the metadata of the file to obtain the block mapping for the file by accessing a range locking database in the file server to set a respective exclusive byte range lock, and then accessing a file block mapping database in the file server to read file block metadata, and then accessing a pre-allocation database in the file server to pre-allocate a new file block to which the data from the client is written. The file server commits the metadata changes to the file by accessing the range locking database to release the respective exclusive byte range lock, and then accessing the file block mapping database to acquire exclusive access to old block metadata, accessing the pre-allocation database to acquire exclusive access to new block metadata, and then transferring the new block metadata from the pre-allocation database to the file block mapping database.

In accordance with yet another aspect, the invention provides a file server including storage for storing a file, at least one processor coupled to the storage for access to the file, and memory for containing a range locking database, a file block mapping database, and a pre-allocation database. The at least one processor is coupled to the memory and programmed for providing clients with concurrent write access to respective byte ranges of the file by the file server responding to a concurrent write request from a client by accessing metadata of the file to obtain a block mapping for the concurrent write request, and then writing data from the client to the file using the block mapping for the concurrent write request, and then committing metadata changes to the file. The at least one processor is also programmed for accessing the metadata of the file to obtain the block mapping for the concurrent write request by accessing the range locking database in the memory to set a respective exclusive byte range lock, accessing the file block mapping database in the memory, and accessing the pre-allocation database in the memory. The at least one processor is further programmed for committing the metadata changes to the file by accessing the range locking database in the memory to release the respective exclusive byte range lock, accessing the file block mapping database in the memory, accessing the pre-allocation database in the memory, and writing the metadata changes to the storage.

BRIEF DESCRIPTION OF THE DRAWINGS

Additional features and advantages of the invention will be described below with reference to the drawings, in which.

Figure 1:
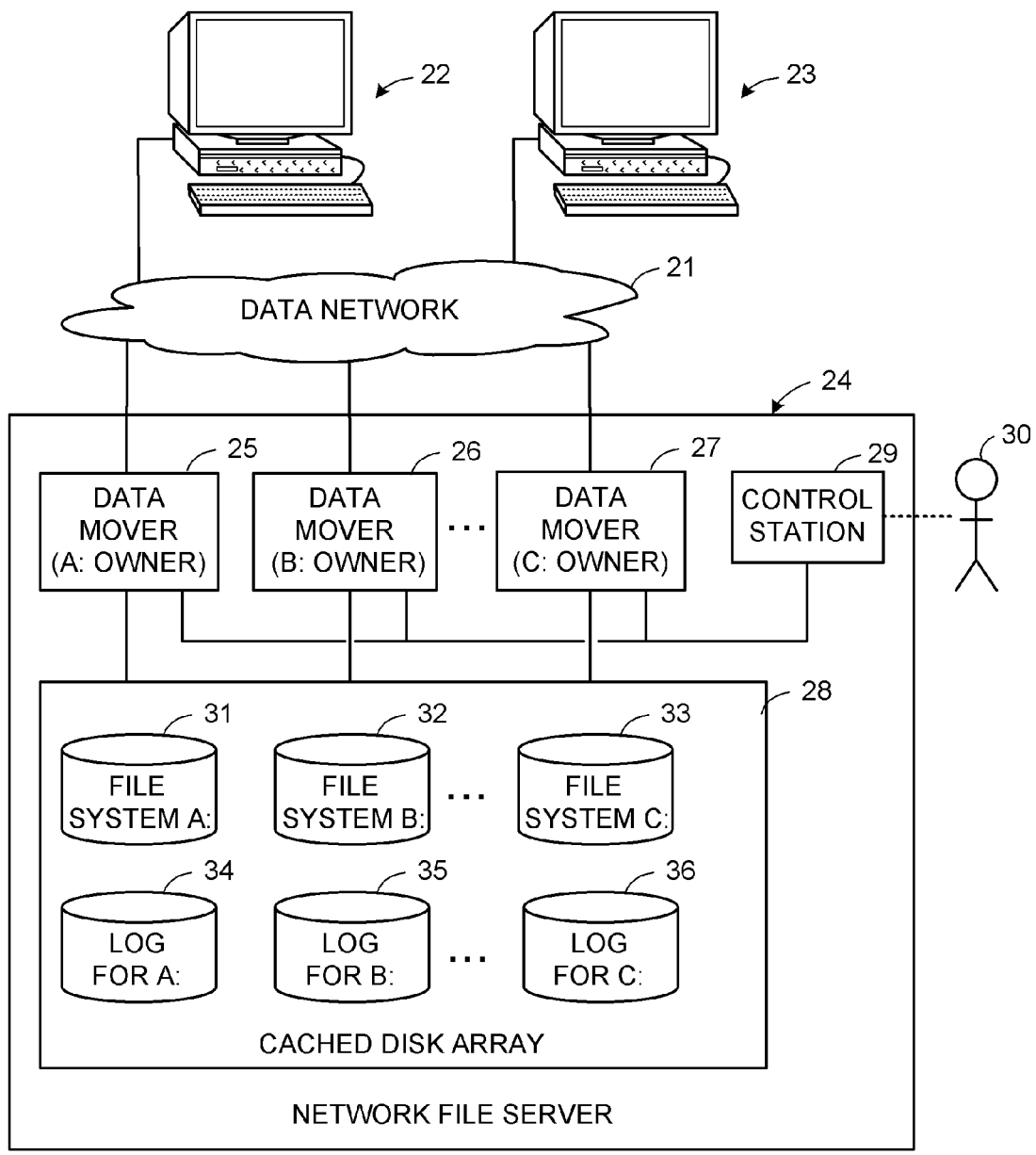
FIG. 1 is a block diagram of a data network including a network file server programmed for byte range locking of files in accordance with the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

FIG. 1 shows a data processing system incorporating the present invention. The data processing system includes a data network 21 interconnecting a number of clients 22, 23 and servers such as a network file server 24. The data network 21 may include any one or more of network connection technologies, such as Ethernet, and communication protocols, such as TCP/IP. The clients 22, 23, for example, are workstations such as personal computers using either UNIX or Microsoft Windows operating systems. Various aspects of the network file server 24 are further described in Vahalia et al., U.S. Pat. No. 5,893,140 issued Apr. 6, 1999, incorporated herein by reference, and Xu et al., U.S. Pat. No. 6,324,581, issued Nov. 27, 2002, incorporated herein by reference.

The network file server 24 includes a cached disk array 28 and a number of data mover computers, for example 25, 26, 27, and more. The network file server 24 is managed as a dedicated network appliance, integrated with popular network file systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost. The network file server 24 also has a control station 29 enabling a system administrator 30 to configure and control the file server.

In the network environment of FIG. 1, is usually desirable to permit any of the clients 22, 23 to access the same file in storage of the cached disk array 28 from any of the data movers 25, 26, 27. To ensure data consistency in this situation, a respective one of the data movers is designated as the exclusive owner of each file for the purpose of granting read-write access to the file. For example, files in the storage of the cached disk array 28 are organized into disjoint file systems such as the file system 31 named "A:" and owned by the data mover 25, the file system 32 named "B:" and owned by the data mover 26, and the file system 33 named "C:" and owned by the data mover 27. For recovery purposes, each file system has an associated file system log in the storage of the cached disk array 28. Thus, the file system named "A:" has a log 34, the file system named "B:" has a log 35, and the file system named "C:" has a log 36.

For example, a data mover that owns a file functions as a metadata server for the file and responds to requests from other data movers or other FMP clients for service upon metadata of the file in accordance with a file mapping protocol (FMP). The metadata requests include a "get_mapping" request, an "allocate block" request, and a "commit_block" request.

The "get_mapping" request is used to query file block mappings. A logically contiguous extent of file blocks is specified as an argument. The metadata server returns, for each requested block, the identity of the logical volume containing the block, and the location of the block within the logical volume address space. The "get_mapping" operation succeeds only if the metadata server can grant a read delegation for each requested block. If a conflict occurs, the metadata server can tell the requesting FMP client to retry the request later, and in the meantime, attempt to revoke the conflicting read locks held by other FMP clients.

In order to write to a file, an FMP client sends an allocate block request to the metadata server. Again, an extent of file blocks is the argument. For this operation, the metadata server attempts to grant a write delegation for each requested block. If the metadata server succeeds, then it processes each block in the requested extent. For those blocks that already exist in the file mapping, the metadata server simply returns the block mapping information as above. But for those blocks which do not exist—either because they are file holes, or because they are beyond the current end of the file—the metadata server provisionally allocates locations on the logical volume to store these new blocks, and it is these locations that it returns to the client.

Once the FMP client has written data to the new locations, it can cause them to become permanently part of the file by sending a commit_block request to the metadata server. This request asks the metadata server to update the file's metadata to reflect that the new blocks are now a part of the file. If the FMP client chooses not to write to the blocks after all, or simply decides to release the delegation on a particular set of blocks (perhaps at the request of the metadata server), it can send a release_block request to the metadata server. As in NFSv4, a client's delegations are controlled by a lease, granted by the metadata server. If the lease is not renewed within a certain time period, then the metadata server is free to grant delegations for the blocks in question to other clients.

The following is an example of using the FMP requests for reading data. Upon receipt of a file read request from an application, an FMP client sends a "get_mapping" request to the metadata server. The metadata server reads the file mapping, and returns a reply to the client. The FMP client uses the file mapping to read file data from storage, and then the client returns the file data to the application. For subsequent reads, the FMP client may use cached data or cached mappings.

The following is an example of using the FMP requests for writing data. Upon receipt of a file write request from an application, an FMP client sends an "alloc_block" request to the metadata server. The metadata server pre-allocates storage blocks, and returns a reply to the client. The FMP client writes the new file data from the application to the pre-allocated blocks in storage. Then the FMP client sends a "commit_block" request to the metadata server. The metadata server responds by adding the pre-allocated blocks to the file mapping. For subsequent writes, the FMP client may use cached pre-allocated blocks.

Figure 2:
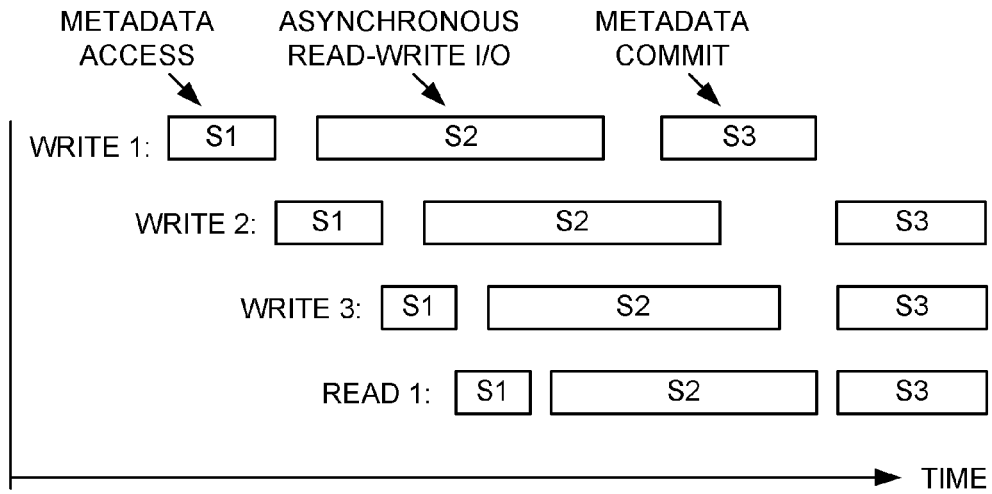
FIG. 2 is a timing diagram showing the pipelining of metadata access, asynchronous read-write I/O, and metadata commit for a read-write access to a file.

FIG. 2 shows that metadata operations can be pipelined during concurrent read and write operations because the read and write data I/O operations do not involve any metadata interactions. The read or write is divided into three steps, namely a metadata access step (S1) including inode access for reads and writes and pre-allocation for writes, an asynchronous data I/O step (S2) for reads and writes, and a metadata commit step (S3) including inode access and metadata update for reads and writes and pre-allocation commit for writes (S3). With pipelining, multiple asynchronous reads and writes can be performed concurrently. This results in an increase in the number of read and write operations that can be performed in a given time period. In addition, multiple commits (S3) for the same file may occur simultaneously by gathering the commit requests together.

Figure 3:
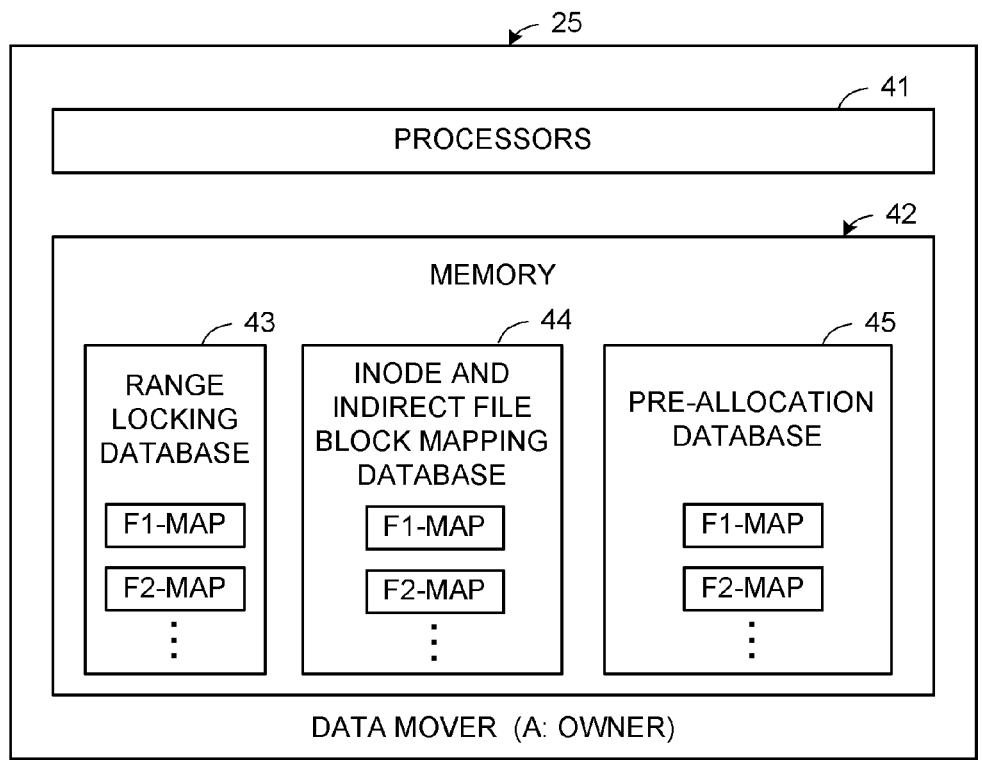
FIG. 3 is a block diagram showing a range locking database, an inode and indirect file block mapping database, and a pre-allocation database in memory of a data mover of the file server of FIG. 1.

It has been discovered that it is possible to enhance the execution of concurrent read-write operations to non-overlapping byte ranges within the same file by pipelining operations within the initial metadata access step and also by pipelining operations within the metadata commit step. As shown in FIG. 3, the data mover 25 includes processors 41 and memory 42 storing a range locking database 43, an inode and indirect file block mapping database 44, and a pre-allocation database 45. The pipelining of operations within the initial metadata access step (S1) and also within the metadata commit step (S3) parallelizes access to file information in the range locking database 43, the inode and indirect file block mapping database 44, and the pre-allocation database 45.

The range locking database 43 includes a unique file map (F1-MAP, F2-MAP) of range locks for each file (F1, F2) owned by the data mover 25. The range locks for each file serialize overlapping read or write requests for access to the file. In other words, an attempt by the metadata server to obtain a read or write range lock upon a file will stall until a conflicting range lock for a prior request is released.

The inode and indirect file block mapping database 44 is an in-memory cache of persistent on-disk metadata for the file systems owned by the data mover 25. The database 44 includes a separate inode and indirect block map (F1-MAP, F2-MAP) for each file (F1, F2) owned by the data mover 25. The persistent on-disk metadata includes the metadata in the inodes and indirect blocks for each file owned by the data mover 25.

The pre-allocation database 45 includes a unique pre-allocation map (F1-MAP, F2-MAP) for each file (F1, F2) owned by the data mover 25. The pre-allocation map for each file is shared for all write operations that write to new blocks for the file. For some "write anywhere" file systems, all writes occur to new blocks of the files of the file system. In other kinds of file systems, writes to new blocks of each file occur only when writing to a "hole" in the file or when writing to an extension of the file; otherwise, the write is a "re-write" that occurs "in place" to a block already committed to the file. The allocation of new file blocks to a file (in the metadata access step S1) does not update the on-disk metadata for the file, because the new file blocks are not committed until step S3 after the new file blocks are written to, and therefore the allocation in step S1 is called "pre-allocation." The pre-allocation of new file blocks in step S1 updates the pre-allocation map for the file in the pre-allocation database 45. During the commitment of the new file blocks (in step S3), the metadata for the file is updated to include the new file blocks by removing the new file blocks from the pre-allocation map for the file and adding the new file blocks to the metadata for the file, and flushing the metadata changes to the file system log. The pre-allocation map contains a representation of the file's metadata as it exists on disk, and the file's metadata as it will be on disk once the commit step has been performed. The pre-allocation map representation of the indirect block metadata may be incomplete, because the pre-allocation map may include only as much file system blocks as needed for a particular allocation.

Figure 4:
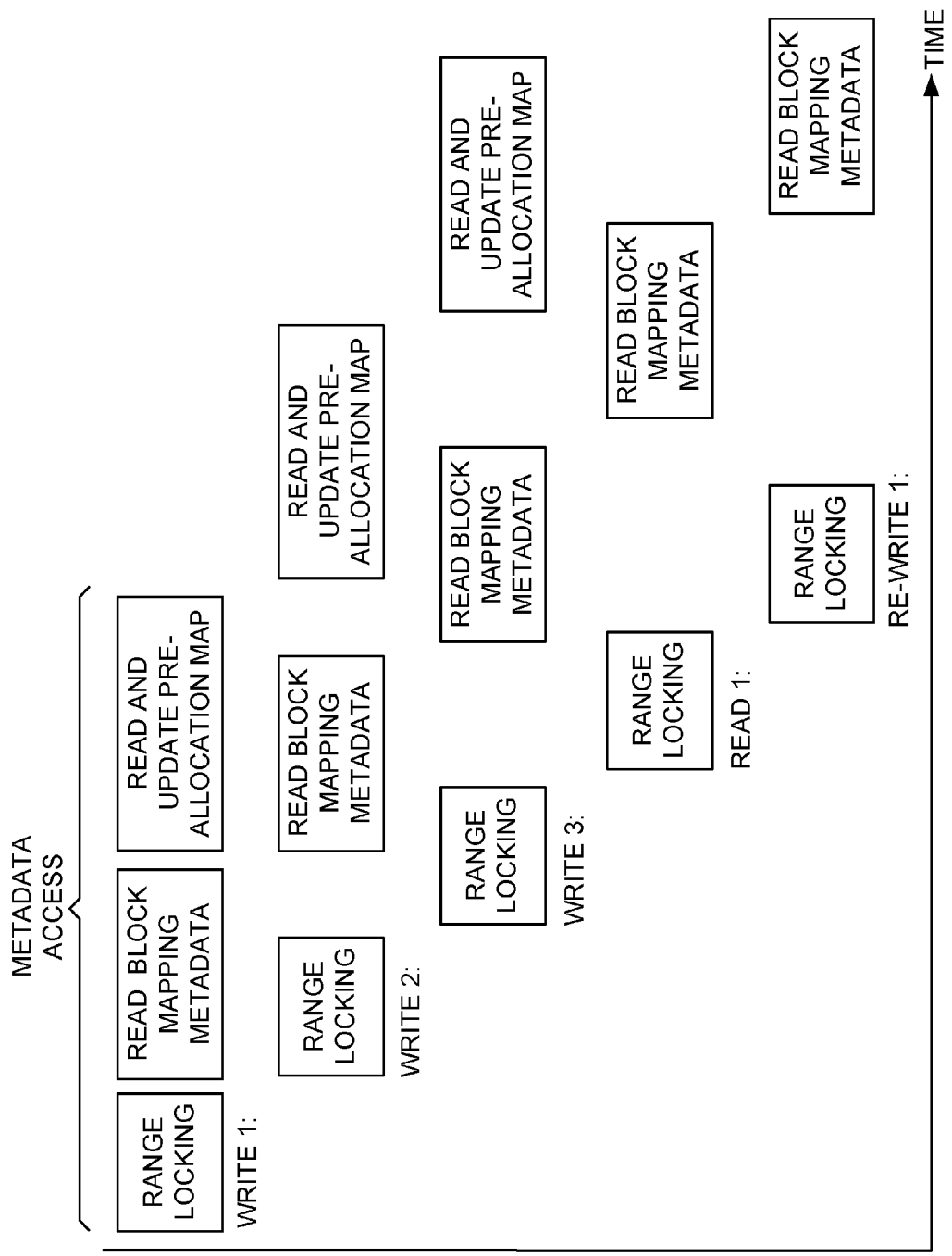
FIGS. 4 and 5 are timing diagrams showing the pipelining of sub-operations within the metadata access step.

FIG. 4 shows pipelining within the metadata access step (S1). Each metadata access for a write to a new block of a file includes range locking, reading inode or indirect block metadata, and then reading and updating the pre-allocation map for the file. Each metadata for a read or a re-write to an already committed block of the file includes range locking and then reading inode or indirect block metadata. Splitting the metadata access step (S1) into three pipelined sub-operations enhances efficiency because: (1) the range locking does not read file metadata from disk, or read or write to the pre-allocation map; (2) reading inode or indirect block metadata does not access the file lock database or the pre-allocation map; and (3) reading and updating the pre-allocation map does not access the file lock database.

Figure 6:
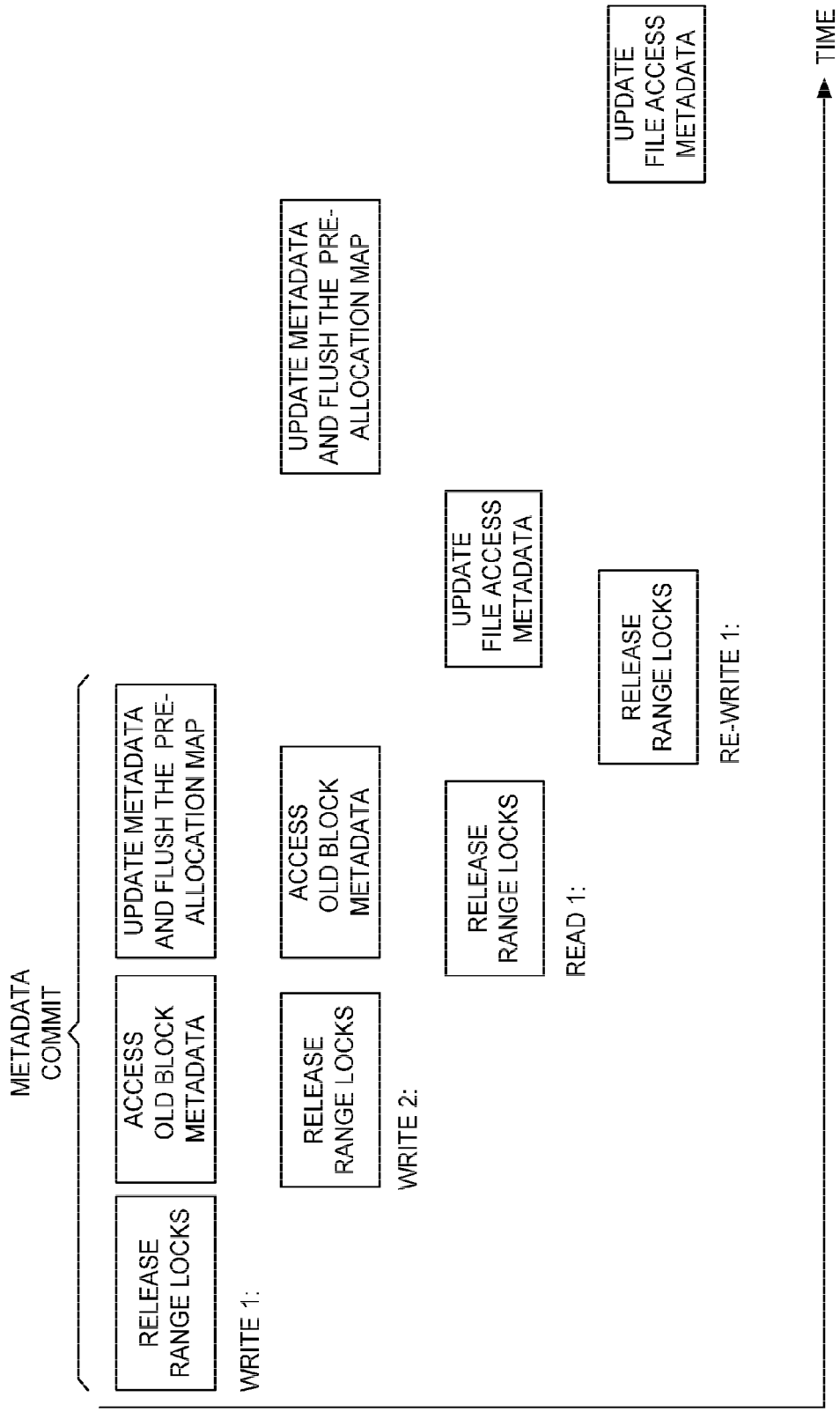
FIGS. 6 and 7 are timing diagrams showing the pipelining of sub-operations within the metadata commit step.

FIG. 6 shows pipelining within the metadata commit step (S3). Each metadata commit for a write to a new block of a file includes range lock verification, reading inode or indirect block metadata, and updating the metadata and flushing the pre-allocation map. Splitting the metadata commit step (S3) into three pipelined sub-operations enhances efficiency because: (1) the range lock verification does not read file metadata from disk, or read or write to the pre-allocation map; (2) reading inode or indirect block metadata does not access the file lock database or the pre-allocation map; and (3) flushing the pre-allocation map does not access the file lock database. Flushing the pre-allocation map may write metadata to disk and update the pre-allocation map.

Figure 5:
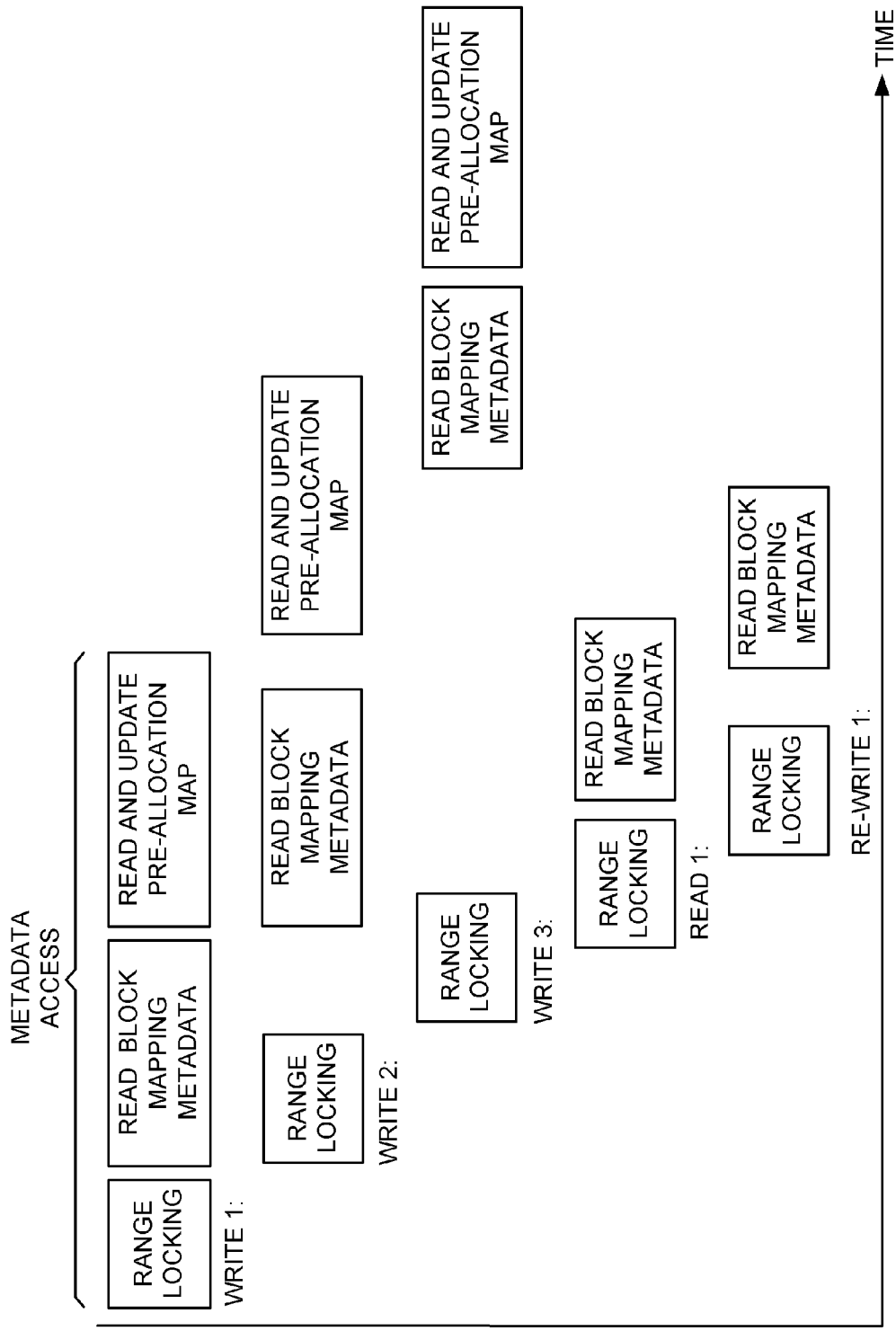
Figure 7:
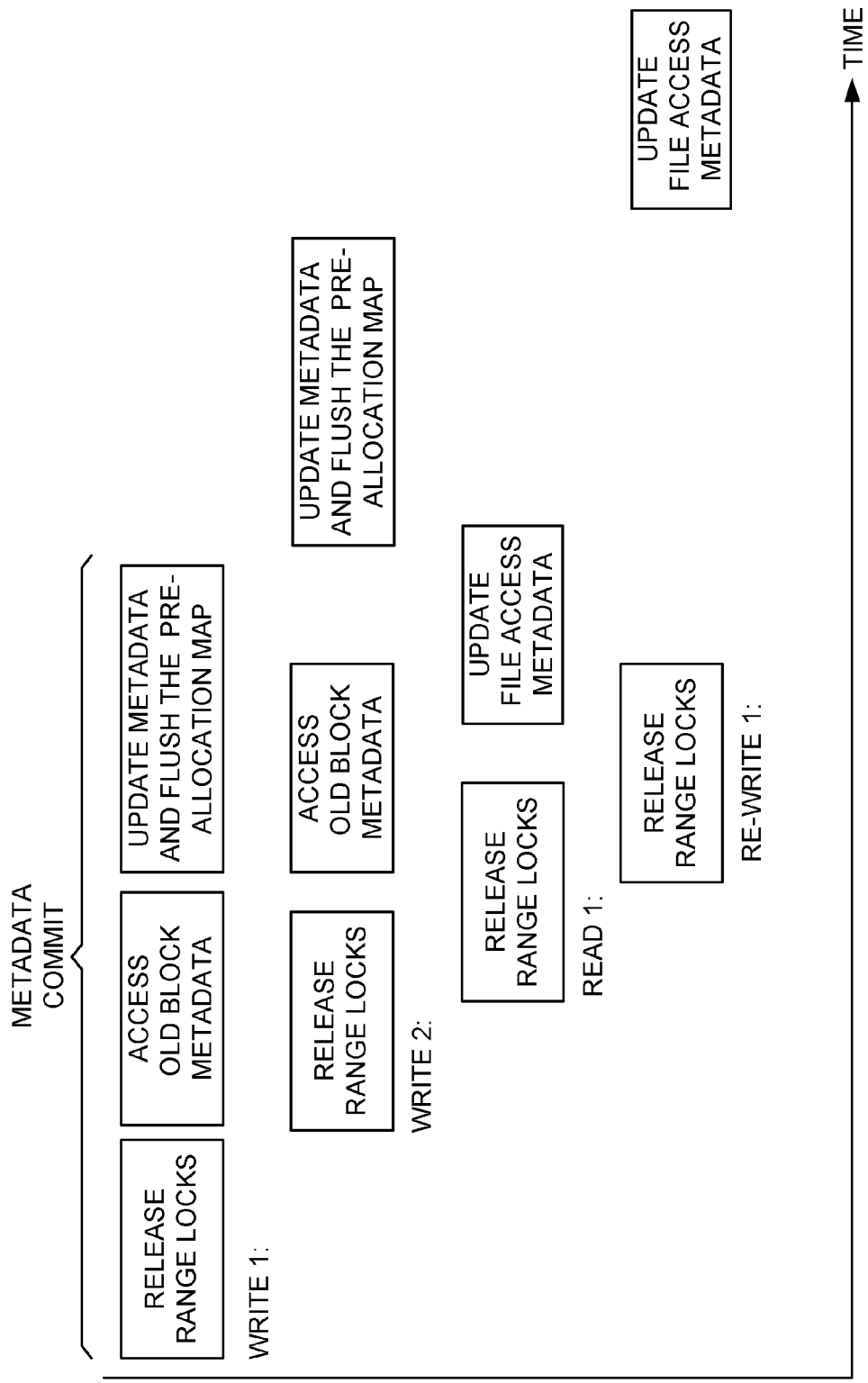

Pipelining of the metadata access and commit steps may ensure that no two operations will perform the same sub-operation of the metadata access or commit step at the same time. In order to increase performance further still, this restriction can be relaxed and parallel execution of sub-operations of the metadata access or commit step can be allowed, with the following restrictions. In order to parallelize the sub-operations of the metadata access step (S1) and the metadata commit step (S3), fine-grained locking within layers is used between the sub-operations as illustrated in FIGS. 5 and 7. In particular, the range locking data base provides shared locks for reads and exclusive locks for writes. The inode and indirect file block mapping data base also uses shared locks for reads and exclusive locks for writes. The pre-allocation map database also uses both shared and exclusive locks. The inode and indirect file block map for each file has a hierarchical structure, and the pre-allocation map for the file has a similar hierarchical structure. The locks on the inode and indirect file block map and on the pre-allocation map should not be global, and instead, each hierarchical element in the map's tree structure should have its own lock. In order to avoid deadlocks, the locks on the hierarchical elements should be acquired in a top-down hierarchical sequence and released in a bottom-up hierarchical sequence.

Figure 8:
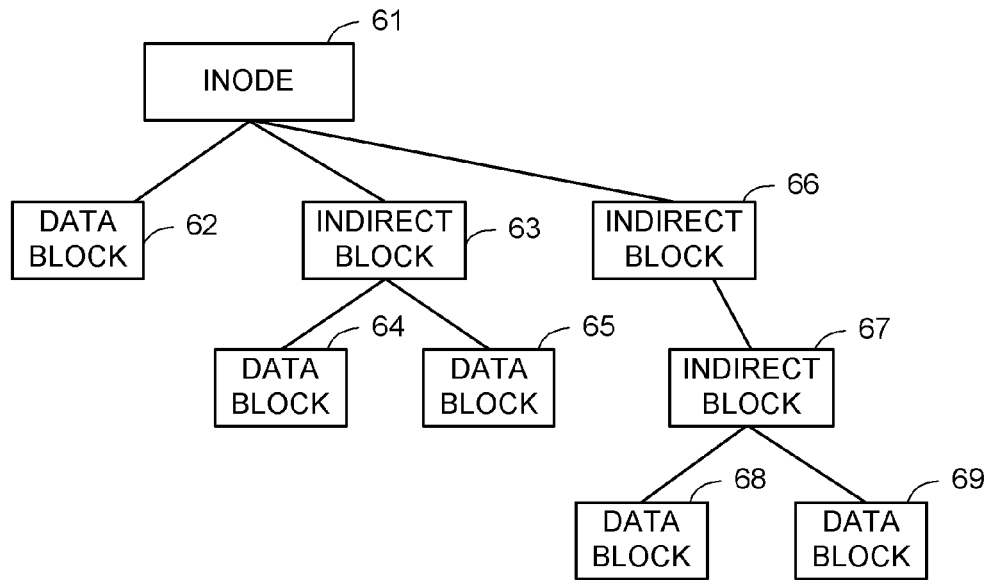
FIG. 8 shows a file consisting of a hierarchy of file system blocks.

FIG. 8, for example, shows the on-disk hierarchical structure of a file. The file includes an inode 61 at the top of the hierarchy. A data block 62, an indirect block 63, and an indirect block 66 are linked to the inode 61. Data blocks 64 and 65 are linked to the indirect block 63. An indirect block 67 is linked to the indirect block 66. Data blocks 68 and 69 are linked to the indirect block 67. Metadata of the file is contained in the inode 61 and in the indirect blocks 63, 66, 67.

Figure 9:
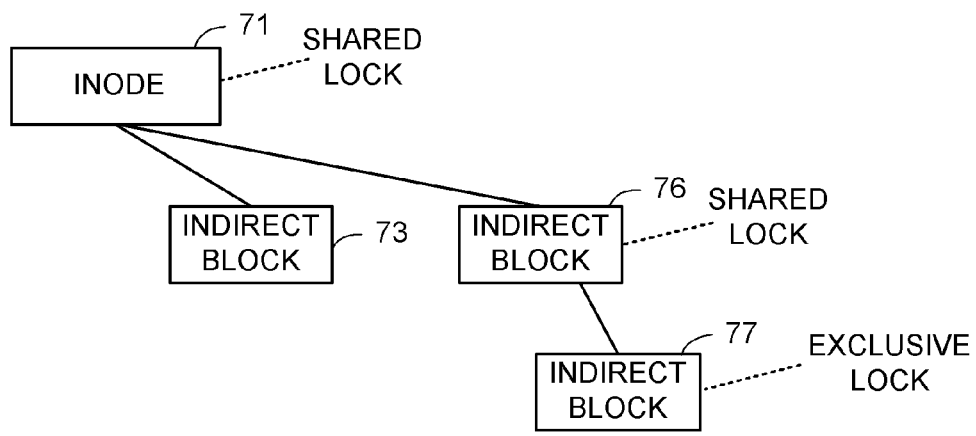
FIG. 9 shows an inode and indirect block map for the file of FIG. 6.

As shown in FIG. 9, the inode and indirect file block map for the file of FIG. 8 has a hierarchical structure similar to the arrangement of the inode 61 and indirect blocks 63, 66, and 67 in FIG. 8. In other words, it includes an inode 71 linked to indirect blocks 73 and 76, and an indirect block 77 linked to the indirect block 76. The pre-allocation map for the file has a similar structure. At any given time, however, the inode and indirect file block map may include only an inode and descendant indirect blocks of the inode as presently kept in memory or as needed for data block allocation or for intermediate linkage to the inode. In a similar fashion, at any given time, the pre-allocation map for the file may include only the inode, file system blocks containing metadata for pre-allocated blocks, and intermediate file system blocks linking the inode to the file system blocks containing metadata for the pre-allocated blocks.

For a write operation upon a data block, an exclusive lock is needed upon the inode or indirect block that is the parent of the data block. This inode or indirect block contains the metadata specifying the logical block mapping needed for a read or write I/O of data to the data block. To obtain an exclusive lock up an indirect block of a file, however, a shared lock is first obtained over the inode of the file, and a shared lock is also obtained over each indirect block that is a descendant of the inode and also a predecessor of the indirect block that is the parent of the data block to be accessed. These shared locks are placed upon the inode and upon the predecessor indirect blocks in sequence during a top-down search through the hierarchy. The locks are kept in the block map for the file in the inode and indirect file block mapping database, and in the pre-allocation map for the file. The locks are released during a bottom-up traversal of the hierarchy beginning with release of the exclusive lock upon the inode or indirect block that is the parent of the data block that was accessed.

Figure 10:
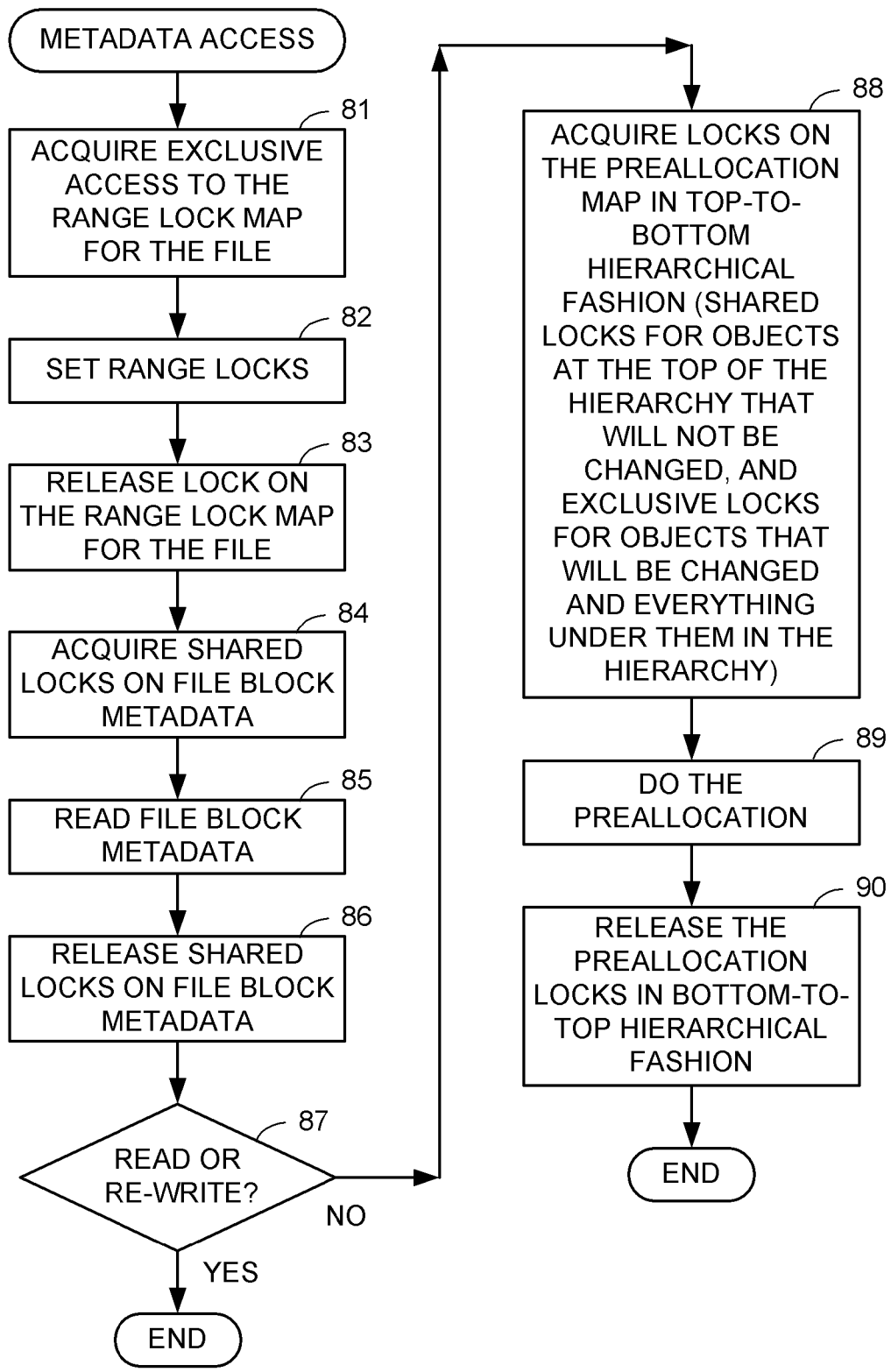
FIG. 10 is a flowchart of the metadata access step for read-write access to a file.

FIG. 10 shows a flowchart of the metadata access for a read-write operation upon a file. In a first step 81, the metadata server for the file acquires exclusive access to the range lock map for the file. In step 82, the metadata server checks for conflicts with any overlapping pre-existing range lock, and once there is no conflict, the metadata server sets range locks for the read-write operation in the range lock map for the file. A write or re-write to a range of blocks in a file requires exclusive access to the range of blocks, and a read of a range of blocks in the file requires shared access to the range of blocks. In step 83, the metadata server releases the lock that was acquired in step 81 upon the range lock map for the file.

In step 84, the metadata server for the file acquires shared locks in the block map for the file upon inode or indirect block metadata for the file. The shared locks are acquired in a top-town hierarchical fashion beginning with a shared lock upon the inode of the block map for the file and ending with a shared lock upon the parent inode or indirect block of each file system data block to be accessed. Thus, the locks are acquired during the search for file system data blocks to be accessed. This search may cause metadata to be read from disk and cached (in the inode and indirect file block mapping database) of the metadata server. Then in step 85, the metadata server reads the file block mapping metadata from the inode or each indirect block that is the parent of each file system data block to be accessed. This metadata includes the block mapping information that is needed for read or write I/O data access to each file system data block to be accessed. In step 86, the shared locks on the block metadata are released.

In step 87, for a read or re-write operation, the metadata access is finished. Otherwise, for a write operation, execution branches to step 88. In step 88, the metadata server acquires locks on the metadata blocks of the pre-allocation map including shared locks for objects at the top of the hierarchy that will not be changed, and exclusive locks for objects that will be changed and everything under them in the hierarchy. For example, if a new file system data block to be pre-allocated is to be a child of an existing indirect block, then an exclusive lock is acquired on the indirect block that is the parent of the file system data block, and a shared lock is acquired on the inode and on any descendant indirect block that is also a predecessor of the indirect block that is the parent of the file system data block. However, it is possible for multiple new file system data blocks to be pre-allocated for a write operation, including new file system data blocks having different parent file system blocks. In this case, an exclusive lock is acquired on each parent file system block. In step 89, the metadata server does the pre-allocation by adding links and file mapping information for the new file system data blocks to the inode or indirect blocks of the pre-allocation map. In step 90, the metadata server releases the locks on the pre-allocation map that were acquired in step 88, and the metadata access is finished.

Figure 11:
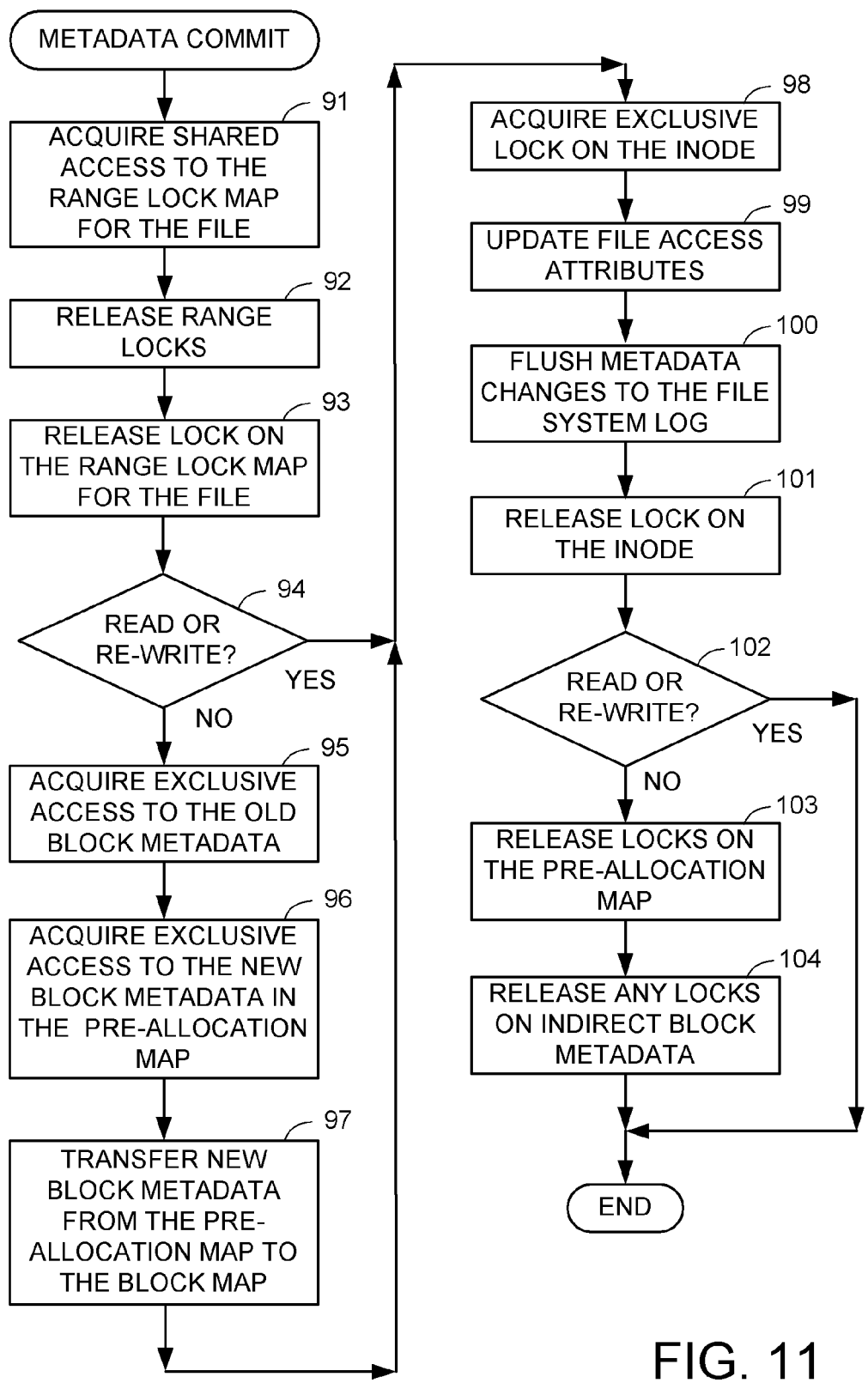
FIG. 11 is a flowchart of the metadata commit step for read-write access to a file.

FIG. 11 shows a flowchart of the metadata commit for a read-write operation upon a file. In a first step 91, the metadata server for the file acquires shared access to the range lock map for the file. In step 92, the metadata server releases range locks of the read-write operation from the range lock map for the file. In step 93, the metadata server releases the lock that was acquired in step 91 upon the range lock map for the file.

In step 94, for a read or re-write operation, execution branches to step 98. Otherwise, for a write, execution continues to step 95. In step 95, the metadata server acquires exclusive access in the block map for the file upon old block metadata for the file. Locks are acquired in a top-town hierarchical fashion beginning with the inode of the block map for the file and ending with an exclusive lock upon the lowest predecessor in the block map of the new pre-allocated data blocks that have been written to, and in the process shared locks are obtained on any higher predecessor file system blocks in the hierarchy. Then in step 96, the metadata server acquires exclusive access to the block metadata for the new blocks in the pre-allocation map for the file. This includes exclusive locks on the inode or indirect blocks having the block metadata for the new pre-allocated blocks written to by the write operation, and shared locks upon predecessor file system blocks in the pre-allocation map for the file. In step 97, the metadata server transfers the new block metadata from the pre-allocation map to the block map. In other words, the new block metadata is committed to the in-memory file system. Execution continues from step 97 to step 98.

In step 98, the metadata server acquires an exclusive lock on the inode in the block map for the file. In step 99, the metadata server updates file access attributes in the inode in the block map including the file access time attribute and the file modification time attribute for a write or re-write. In step 100, the metadata server flushes the metadata changes to the file system log. In other words, the new metadata is committed to the on-disk file system. Typically, the metadata changes, which have been written into the in-memory block map for the file, are not written into the on-disk file system until the file is closed. If a crash of the network file server occurs before the file is closed, the committed state of the file system can be recovered by writing the metadata changes from the log into the on-disk file system.

In step 101, the metadata server releases the lock on the inode that was acquired in step 98. In step 102, for a read or re-write operation, the metadata commit is finished. Otherwise, for a write operation, execution continues to step 103. In step 103, the metadata server releases the locks on the pre-allocation map that were set in step 96. In step 104, the metadata server releases the locks on any indirect block metadata that were set in step 95. After step 104, the metadata commit is finished.

In view of the above, there has been described a method of enhancing the execution of concurrent read-write operations to non-overlapping byte ranges within the same file by pipelining operations within an initial metadata access step and also by pipelining operations within a metadata commit step.

The pipelined operations parallelize access to a range locking database, an inode and indirect file block mapping database, and a pre-allocation database. The pipelined operations within the metadata access step include a first stage of range locking, a second stage of reading block mapping metadata, and a third stage of reading and updating a pre-allocation map for write access. The pipelined operations within the metadata commit step include a first stage of releasing range locks, a second stage of accessing old block metadata for write access, and a third stage of updating metadata and flushing the pre-allocation map for write access.

What is claimed is:

1. A method of operating a file server computer for providing clients with concurrent write access to respective byte ranges of a file in storage of the file server computer, the method comprising:

the file server computer responding to a concurrent write request from a client by accessing metadata of the file to obtain a block mapping for the concurrent write request, and then writing data from the client to the file using the block mapping for the concurrent write request, and then committing metadata changes to the file, the metadata changes including change in an allocation of file blocks to the file;

wherein the file server computer accesses the metadata of the file to obtain the block mapping for the concurrent write request by accessing a range locking database in the file server computer to set a respective exclusive byte range lock upon one of the respective byte ranges of the file, accessing a file block mapping database in the file server computer, and accessing a pre-allocation database in the file server computer to pre-allocate a new file block to which the data from the client is written, and wherein the file server computer commits the metadata changes to the file by accessing the range locking database to release the respective exclusive byte range lock, accessing the file block mapping database, accessing the pre-allocation database, and writing the metadata changes to the storage of the file server computer to commit the new file block to the file in the storage the file server computer.

2. The method as claimed in claim 1, wherein the range locking database, the file block mapping database, and the pre-allocation database are accessed in memory of the file server computer.

3. The method as claimed in claim 2, which includes the file server computer maintaining the file block mapping database as a cache of on-disk file system metadata, wherein the file server computer maintains the file block mapping database as a hierarchical data structure including an inode containing metadata of an on-disk inode of the file, and including an indirect block containing metadata of an on-disk indirect block of the file.

4. The method as claimed in claim 3, wherein the metadata changes include changes to metadata of the indirect block of the file, and wherein the method includes the file server computer accessing the file block mapping database to commit the metadata changes by acquiring a shared lock on the inode in the file block mapping database, and then acquiring an exclusive lock on the indirect block in the file block mapping database, and then writing the changes to the metadata of the indirect block of the file to the indirect block in the file block mapping database.

5. The method as claimed in claim 1, wherein the file server computer commits the metadata changes to the file by accessing the file block mapping database to acquire exclusive access to old block metadata of the file, accessing the pre-allocation database to acquire exclusive access to new block metadata of the file, and then transferring the new block metadata from the pre-allocation database to the file block mapping database.

6. The method as claimed in claim 1, wherein the file server computer accesses the metadata of the file to obtain the block mapping for the file by accessing the range locking database to set the respective exclusive byte range lock, and then accessing the file block mapping database, and then accessing the pre-allocation database, and
wherein the file server computer commits the metadata changes to the file by accessing the range locking database to release the respective exclusive byte range lock, and then accessing the file block mapping database, and then accessing the pre-allocation database, and then writing the metadata changes to the storage.

7. The method as claimed in claim 1, wherein the file server computer writes the metadata changes to the storage by writing the metadata changes to a file system log in storage.

8. The method as claimed in claim 1, which further includes the file server computer responding to a concurrent read request from at least one client by:
accessing the range locking database to set a respective shared byte range lock, and accessing the file block mapping database to obtain a block mapping for the concurrent read request, and then
reading data from the file using the block mapping for the concurrent read request, and sending the data read from the file to said at least one client, and then
accessing the range locking database to release the respective shared byte range lock, and writing a file access metadata change to the storage of the file server computer.

9. A method of operating a file server computer for providing clients with concurrent write access to respective byte ranges of a file in storage of the file server computer, the method comprising:
the file server computer responding to a concurrent write request from a client by accessing metadata of the file to obtain a block mapping for the file, and then asynchronously writing data from the client to the file using the block mapping for the file, and then committing metadata changes to the file the metadata changes including a change in an allocation of file blocks to the file,
wherein the file server computer accesses the metadata of the file to obtain the block mapping for the file by accessing a range locking database in the file server computer to set a respective exclusive byte range upon one of the respective byte ranges of the and then accessing a file block mapping database in the file server computer to read file block metadata, and then accessing a pre-allocation database in the file server computer to pre-allocate a new file block to which the data from the client is written;
wherein the file server computer commits the metadata changes to the file by accessing the range locking database to release the respective exclusive byte range lock, and then accessing the file block mapping database to acquire exclusive access to old block metadata, accessing the pre-allocation database to acquire exclusive access to new block metadata, and then transferring the new block metadata from the pre-allocation database to the file block mapping database to commit the new file block to the file in the storage of the file server computer.

10. The method as claimed in claim 9, which includes the file server computer maintaining the file block mapping database in memory of the file server computer as a cache of on-disk file system metadata, wherein the file block mapping database is maintained as a hierarchical data structure, the hierarchical data structure including an inode containing metadata of an on-disk inode of the file, and including an indirect block containing metadata of an on-disk indirect block of the file.

11. The method as claimed in claim 10, wherein the metadata changes include changes to metadata of the indirect block of the file, and wherein the method includes the file server computer accessing the file block mapping database to commit the metadata changes by acquiring a shared lock on the inode in the file block mapping database, and then acquiring an exclusive lock on the indirect block in the file block mapping database, and then writing the changes to the metadata of the indirect block of the file to the indirect block in the file block mapping database.

12. The method as claimed in claim 9 which further includes the file server computer responding to a concurrent read request from at least one client by:
accessing the range locking database to set a respective shared byte range lock, and accessing the file block mapping database to obtain a block mapping for the concurrent read request, and then
reading data from the file using the block mapping for the concurrent read request, and sending the data read from the file to said at least one client, and then
accessing the range locking database to release the respective shared byte range lock, and writing a file access metadata change to the storage of the file server computer.

13. The method as claimed in claim 9, wherein the committing of the metadata changes to the file by the file server computer further includes the file server writing the metadata changes to a file system log in the storage.

14. A file server comprising:
storage for storing a file,
at least one processor coupled to the storage for access to the file, and
memory for containing a range locking database, a file block mapping database, and a pre-allocation database,
wherein said at least one processor is coupled to the memory and programmed for providing clients with concurrent write access to respective byte ranges of the file by the file server responding to a concurrent write request from a client by accessing metadata of the file to obtain a block mapping for the concurrent write request, and then writing data from the client to the file using the block mapping for the concurrent write request, and then committing metadata changes to the file, the metadata changes including a change in an allocation of file blocks to the file,
wherein said at least one processor is programmed for accessing the metadata of the file to obtain the block mapping for the concurrent write request by accessing the range locking database in the memory to set a respective exclusive byte range lock upon one of the respective byte ranges of the file, accessing the file block mapping database in the memory, and accessing the pre-allocation database in the memory to pre-allocate a new file block to which the data from the client is written, and
wherein said at least one processor is programmed for committing the metadata changes to the file by accessing the range locking database in the memory to release the respective exclusive byte range lock, accessing the file block mapping database in the memory, accessing the pre-allocation database in the memory, and writing the metadata changes to the storage to commit the new file block to the file in the storage of the file server.

15. The file server as claimed in claim 14, wherein said at least one processor is programmed for maintaining the file block mapping database in the memory as a cache of on-disk file system metadata, the cache of on-disk file system metadata including a hierarchical data structure, the hierarchical data structure including an inode containing metadata of an on-disk inode of the file, and an indirect block containing metadata of an on-disk indirect block of the file.

16. The file server as claimed in claim 15, wherein the metadata changes include changes to metadata of the indirect block of the file, and wherein said at least one processor is programmed for accessing the file block mapping database to commit the metadata changes by acquiring a shared lock on the inode in the file block mapping database, and then acquiring an exclusive lock on the indirect block in the file block mapping database, and then writing the changes to the metadata of the indirect block of the file to the indirect block in the file block mapping database.

17. The file server as claimed in claim 14, wherein said at least one processor is programmed for committing the metadata changes to the file by accessing the file block mapping database to acquire exclusive access to old block metadata of the file, accessing the pre-allocation database to acquire exclusive access to new block metadata of the file, and then transferring the new block metadata from the pre-allocation database to the file block mapping database.

18. The file server as claimed in claim 14, wherein said at least one processor is programmed for accessing the metadata of the file to obtain the block mapping for the file by accessing the range locking database in the memory to set the respective exclusive byte range lock, and then accessing the file block mapping database in the memory, and then accessing the pre-allocation database in the memory, and wherein said at least one processor is programmed for committing the metadata changes to the file by accessing the range locking database in the memory to release the respective exclusive byte range lock, and then accessing the file block mapping database in the memory, and then accessing the pre-allocation database in the memory, and then writing the metadata changes to the storage.

19. The file server as claimed in claim 14, wherein said at least one processor is programmed to write the metadata changes to the storage by writing the metadata changes to a file system log in storage.

20. The file server as claimed in claim 14, wherein said at least one processor is further programmed for responding to a concurrent read request from at least one client by:

accessing the range locking database in the memory to set a respective shared byte range lock, and accessing the file block mapping database in the memory to obtain a block mapping for the concurrent read request, and then reading data from the file using the block mapping for the concurrent read request, and sending the data read from the file to said at least one client, and then accessing the range locking database in the memory to release the respective shared byte range lock, and writing a file access metadata change to the storage.

21. A method of operating a file server computer having storage storing a file, memory containing a range locking database, a file mapping database, and a pre-allocation database, and at least one processor coupled to the storage for access to the file and coupled to the memory for access to the range locking database, the file mapping data base, and the pre-allocation database, and said method comprising:

said at least one processor providing clients with concurrent read-write access to non-overlapping byte ranges of the file including concurrent write access changing an allocation of file blocks to the file in the storage by pipelined processing of client requests for read-write access to the file though a sequence of three steps including a first step of metadata access followed by a second step of asynchronous reading or writing to the file followed by a third step of metadata commitment;

said at least one processor pipelining operations within the first step of metadata access through a first stage of byte range locking for concurrent setting of byte range locks upon the non-overlapping byte range of the file, followed by a second stage of reading block mapping metadata, followed by a third stage of reading and updating a pre-allocation map for write access; and said at least one processor pipelining operations within the third step of metadata commitment through a first stage of releasing the byte range locks, followed by a second stage of accessing old block metadata for write access, followed by a third stage of updating metadata and flushing the pre-allocation map for write access.

22. The method as claimed in claim 21, wherein the updating of the metadata includes changes to metadata of an indirect block of the file, and wherein said at least one processor accesses the file block mapping database to commit the metadata changes by acquiring a shared lock on the inode in the file block mapping database, and then acquiring an exclusive lock on the indirect block in the file block mapping database, and then writing the changes to the metadata of the indirect block of the file to the indirect block in the file block mapping database.

23. The method as claimed in claim 21, wherein said at least one processor commits the metadata changes to the file by accessing the file block mapping database to acquire exclusive access to old block metadata of the file, accessing the pre-allocation database to acquire exclusive access to new block metadata of the file, and then transferring the new block metadata from the pre-allocation database to the file block mapping database.

24. A file server comprising:

storage storing a file;

at least one processor coupled to the storage for access to the file; and memory containing a range locking database, a file block mapping database, and a pre-allocation database;

wherein said at least one processor is coupled to the memory for access to the range locking data base, the file mapping database, and the pre-allocation database, and said at least one processor is programmed to provide clients with concurrent read-write access to non-overlapping byte ranges of the file including concurrent write access changing an allocation of file blocks to the file in the storage by pipelined processing of client requests for read-write access to the file though a sequence of three steps including a first step of metadata access followed by a second step of asynchronous reading or writing to the file followed by a third step of metadata commitment;

said at least one processor is programmed to pipeline operations within the first step of metadata access through a first stage of byte range locking for concurrent setting of byte range locks upon the non-overlapping byte range of the file, followed by a second stage of reading block mapping metadata, followed by a third stage of reading and updating a pre-allocation map for write access; and said at least one processor is programmed to pipeline operations within the third step of metadata commitment through a first stage of releasing the byte range locks, followed by a second stage of accessing old block metadata for write access, followed by a third stage of updating metadata and flushing the pre-allocation map for write access.

25. The file server as claimed in claim 24, wherein the updating of the metadata includes changes to metadata of an indirect block of the file, and wherein said at least one processor is programmed to access the file block mapping database to commit the metadata changes by acquiring a shared lock on the inode in the file block mapping database, and then acquiring an exclusive lock on the indirect block in the file block mapping database, and then writing the changes to the metadata of the indirect block of the file to the indirect block in the file block mapping database.

26. The file server as claimed in claim 24, wherein said at least one processor is programmed to commit the metadata changes to the file by accessing the file block mapping database to acquire exclusive access to old block metadata of the file, accessing the pre-allocation database to acquire exclusive access to new block metadata of the file, and then transferring the new block metadata from the pre-allocation database to the file block mapping database.

* * * * *